(12) United States Patent
Dillon et al.

(10) Patent No.: US 11,767,795 B2
(45) Date of Patent: Sep. 26, 2023

(54) GASEOUS FUEL LEAKAGE FROM FUEL SYSTEM MANIFOLD TO ENGINE

(71) Applicant: PRATT & WHITNEY CANADA CORP., Longueuil (CA)

(72) Inventors: Thomas Dillon, Etobicoke (CA); Todd Miller, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/406,595

(22) Filed: Aug. 19, 2021

(65) Prior Publication Data
US 2023/0055438 A1  Feb. 23, 2023

(51) Int. Cl.
*F02C 9/26* (2006.01)
*F02C 7/22* (2006.01)
*F02C 3/22* (2006.01)

(52) U.S. Cl.
CPC .......... *F02C 9/26* (2013.01); *F02C 3/22* (2013.01); *F02C 7/22* (2013.01); *F05D 2220/32* (2013.01); *F05D 2240/35* (2013.01); *F05D 2270/20* (2013.01); *F05D 2270/30* (2013.01)

(58) Field of Classification Search
CPC .... F02C 3/22; F02C 7/22; F02C 7/222; F02C 9/26; F02C 9/28
See application file for complete search history.

(56) References Cited

U.S. PATENT DOCUMENTS

| 4,157,012 | A | 6/1979 | DuBell |
| 6,666,029 | B2 | 12/2003 | Ryan |
| 6,876,087 | B2 | 4/2005 | Ho et al. |
| 9,243,804 | B2 | 1/2016 | Zhang et al. |
| 9,909,499 | B2 | 3/2018 | Nguyen et al. |
| 9,932,124 | B2 | 4/2018 | Kamath et al. |
| 2003/0041599 | A1* | 3/2003 | Moser ............... F02C 9/26 60/773 |
| 2005/0132694 | A1 | 6/2005 | Moser |
| 2013/0174570 | A1* | 7/2013 | Kurschat ............ F02C 9/28 60/776 |
| 2016/0320061 | A1* | 11/2016 | Holcomb ............ F23R 3/28 |
| 2018/0106197 | A1* | 4/2018 | Harper ............... F02C 9/263 |
| 2021/0071591 | A1* | 3/2021 | Panov ................. F02C 9/48 |

FOREIGN PATENT DOCUMENTS

| EP | 2256320 | 12/2010 |
| EP | 4130450 | 2/2023 |

* cited by examiner

*Primary Examiner* — Scott J Walthour
(74) *Attorney, Agent, or Firm* — NORTON ROSE FULBRIGHT CANADA LLP (57) ABSTRACT

There are describes methods and systems for operating an engine coupled to a fuel system having a fuel manifold configured to supply fuel to a combustor of the engine. The method comprises receiving a gaseous fuel flow request indicative of a change in demand for gaseous fuel to the engine; applying a fuel loss bias to the gaseous fuel flow request to obtain a biased fuel flow request, the fuel loss bias associated with a change in mass flow rate of the gaseous fuel from the fuel manifold to the combustor in response to the change in demand; and causing the gaseous fuel to flow into the combustor in accordance with the biased fuel flow request.

14 Claims, 5 Drawing Sheets

GASEOUS FUEL LEAKAGE FROM FUEL SYSTEM MANIFOLD TO ENGINE

TECHNICAL FIELD

The disclosure relates generally to engines that operate with a gaseous fuel system.

BACKGROUND OF THE ART

Fuels which exist in the liquid state at room temperature are called liquid fuels. Examples of liquid fuels are kerosene, petrol and diesel. Fuels that exist in the gaseous state at room temperature are called gaseous fuels. Examples of gaseous fuels are hydrogen gas, natural gas, butane and propane. Engines in the aerospace industry have long been designed to operate with liquid fuels. There is growing interest in using zero carbon fuel, such as hydrogen, to propel aircraft. While the methods of operating aircraft engines based on liquid fuel are suitable for their purposes, improvements are needed to adapt to gaseous fuel.

SUMMARY

In one aspect, there is provided a method for operating an engine coupled to a fuel system having a fuel manifold configured to supply fuel to a combustor of the engine. The method comprises receiving a gaseous fuel flow request indicative of a change in demand for gaseous fuel to the engine; applying a fuel loss bias to the gaseous fuel flow request to obtain a biased fuel flow request, the fuel loss bias associated with a change in mass flow rate of the gaseous fuel from the fuel manifold to the combustor in response to the change in demand; and causing the gaseous fuel to flow into the combustor in accordance with the biased fuel flow request.

In another aspect, there is provided a system for operating an engine coupled to a fuel system having a fuel manifold configured to supply fuel to a combustor of the engine. The system comprises a processor and a non-transitory computer-readable medium having stored thereon program instructions. The program instructions are executable by the processor for receiving a gaseous fuel flow request indicative of a change in demand for gaseous fuel to the engine; applying a fuel loss bias to the gaseous fuel flow request to obtain a biased fuel flow request, the fuel loss bias associated with a change in mass flow rate of the gaseous fuel from the fuel manifold to the combustor in response to the change in demand; and causing the gaseous fuel to flow into the combustor in accordance with the biased fuel flow request.

In a further aspect, there is provided a system comprising an engine having a combustor and a fuel system coupled to the engine. The fuel system comprises an arrangement of components connected between a gaseous fuel supply and a fuel manifold fluidly connected to the combustor via at least one set of nozzles. A controller is coupled to the engine and the fuel system, and configured for applying a fuel loss bias to a gaseous fuel flow request to obtain a biased fuel flow request, the fuel loss bias associated with a change in mass flow rate of the gaseous fuel from the fuel manifold to the combustor in response to the change in demand, and causing the gaseous fuel to flow into the combustor in accordance with the biased fuel flow request.

DESCRIPTION OF THE DRAWINGS

Reference is now made to the accompanying figures in which.

DETAILED DESCRIPTION

The present disclosure is directed to methods and systems for operating an engine having at least one fuel manifold configured to supply gaseous fuel to a combustor of the engine. Fuels that exist in the gaseous state at room temperature are called gaseous fuels. Examples of gaseous fuels are hydrogen gas, natural gas, butane and propane. The properties of gaseous fuel differ from the properties of liquid fuel. For example, gaseous fuel is compressible whereas liquid fuel is not. Therefore, there are described herein methods and systems for taking into account the compressibility of gaseous fuel in managing changes in fuel demand to the engine.

Figure 1:
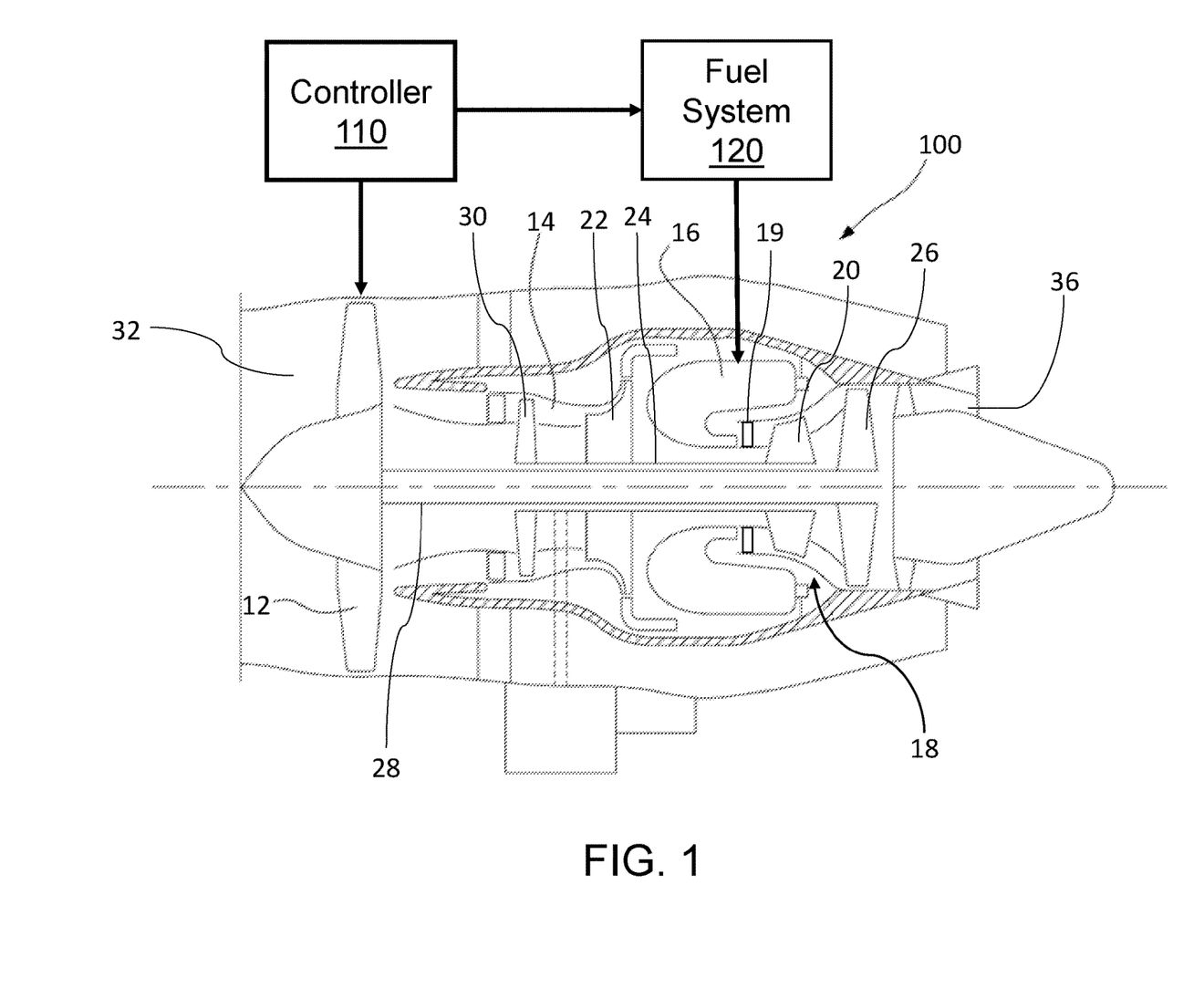
FIG. 1 is a schematic cross sectional view of an example gas turbine engine.

FIG. 1 illustrates an example engine 100 of a type provided for use in subsonic flight. The engine 100 of FIG. 1 is a turbofan engine that generally comprises, in serial flow communication, a fan 12 through which ambient air is propelled toward an inlet 32, a compressor section 14 for pressurizing the air, a combustor 16 in which the compressed air is mixed with fuel and ignited for generating an annular stream of hot combustion gases, and a turbine section 18 for extracting energy from the combustion gases, which exit via an exhaust 36. High-pressure rotor(s) of the turbine section 18 (referred to as "HP turbine rotor(s) 20") are mechanically linked to high-pressure rotor(s) of the compressor section 14 (referred to as "HP compressor rotor(s) 22") through a high-pressure shaft 24. The turbine section 18 includes a circumferential array of turbine inlet vanes 19 between the combustor 16 and the HP turbine rotor(s) 20. Low-pressure rotor(s) of the turbine section 18 (referred to as "LP turbine rotor(s) 26") are mechanically linked to the low-pressure rotor(s) of the compressor section 14 (referred to as "LP compressor rotor(s) 30") and/or the fan rotor 12 through a concentric low-pressure shaft 28 extending concentrically within the high-pressure shaft 24 and rotating independently therefrom.

Although FIG. 1 illustrates the engine 100 as a turbofan engine, it should be noted that the techniques described herein are applicable to other types of gas turbine engines, including turboshaft, turboprop, and turbojet engines, and to other types of combustion engines, including Wankel engines and reciprocating engines. As such, the expression "combustor" should be understood to include any chamber within an engine in which combustion can occur. In some embodiments, the engine forms part of an aircraft. In some embodiments, the engine forms part of a vehicle for land or marine applications. In some embodiments, the engine is used in an industrial setting, for example for power generation or as an auxiliary power unit.

Control of the operation of the engine 100 can be effected by one or more control systems, for example a controller 110, which is communicatively coupled to the engine 100. The operation of the engine 100 can be controlled by way of one or more actuators, mechanical linkages, hydraulic systems, and the like. The controller 110 can be coupled to the actuators, mechanical linkages, hydraulic systems, and the like, in any suitable fashion for effecting control of the engine 100. The controller 110 can modulate the position and orientation of variable geometry mechanisms within the engine 100, the bleed level of the engine 100, and fuel flow, based on predetermined schedules or algorithms. In some embodiments, the controller 110 includes one or more FADEC(s), electronic engine controller(s) (EEC(s)), or the like, that are programmed to control the operation of the engine 100.

Figure 2:
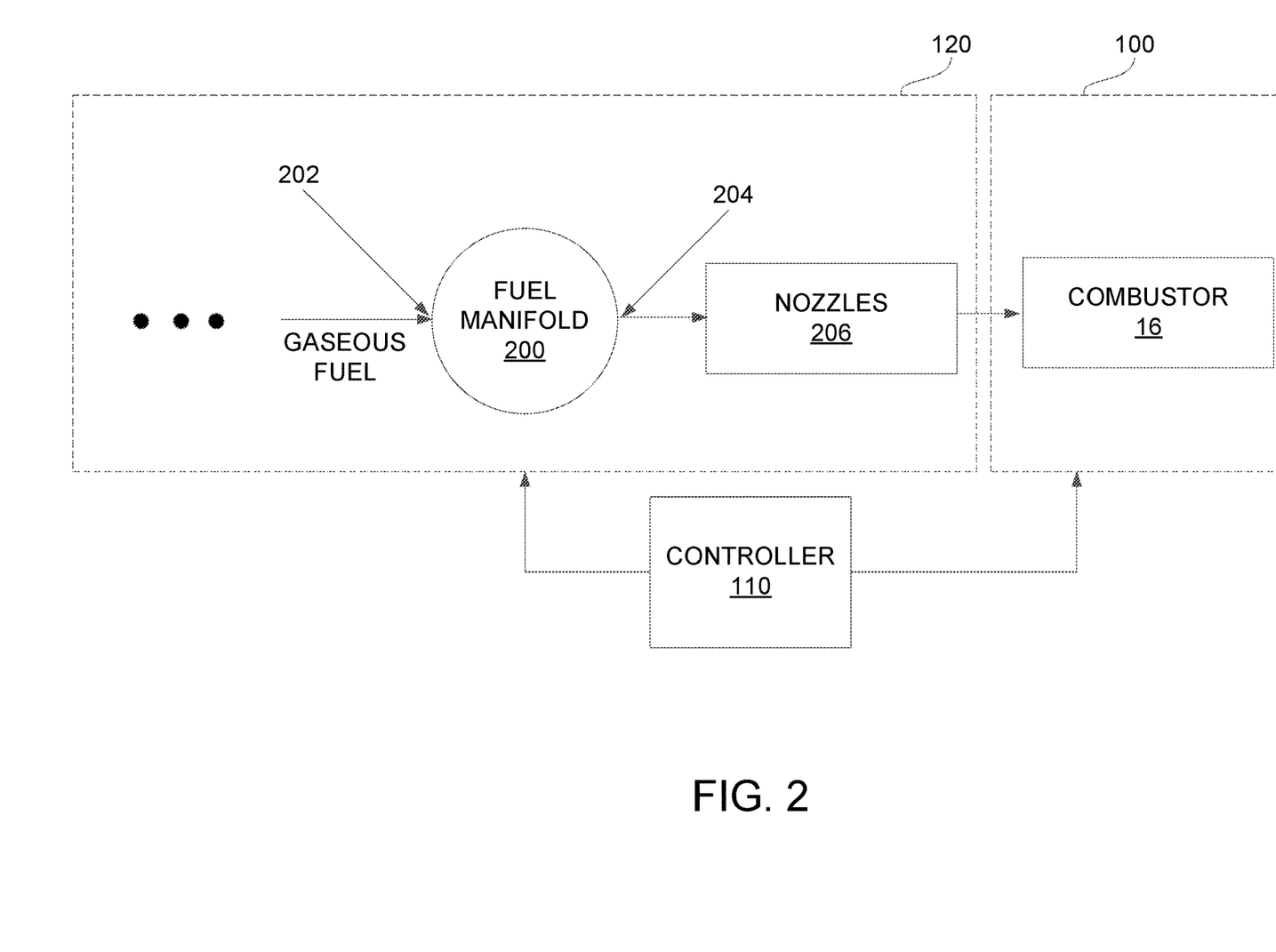
FIG. 2 is a block diagram of part of a fuel system for the engine of FIG. 1.

The controller 110 is configured to regulate fuel flow provided to the engine 100 via a fuel system 120. In particular, the controller 110 is configured to accommodate for fuel flow losses due to the compressibility of gaseous fuel when managing changes in fuel demand. FIG. 2 illustrates a portion of the fuel system 120 in accordance with some embodiments. The fuel system 120 has at least one fuel manifold 200 configured to supply gaseous fuel to the combustor 16 of the engine. The fuel manifold 200 has an inlet 202 at which it receives the gaseous fuel from an arrangement of components, such as valves, valve controllers, pressure transducers, pressure regulators, and/or any other flow control device(s) configured to permit/stop/regulate fluid flow or pressure from a gaseous fuel supply into the fuel manifold 200. The manifold 200 has one or more outlets 204 through which the gaseous fuel flows out of and into a set of fuel nozzles 206. The gaseous fuel passes through the fuel nozzles 206 and into the combustor 16.

The fuel manifold 200 acts as a pressure vessel, with the outlet 204 having a fixed cross-sectional area (e.g. a fixed diameter). The compressibility property of the gaseous fuel causes leaking of gaseous fuel from the outlet 204 of the manifold 200 into the combustor 16, as long as the manifold 200 is pressurized, regardless of demand. When the fuel demand changes, the pressure in the manifold changes, which results in a change in mass flow rate of the gaseous fuel from the manifold 200 to the combustor 16. The change in mass flow rate changes the quantity of gaseous fuel leaking out of the manifold 200 and into the combustor 16, which needs to be accommodated when managing changes in fuel demand.

Figure 3:
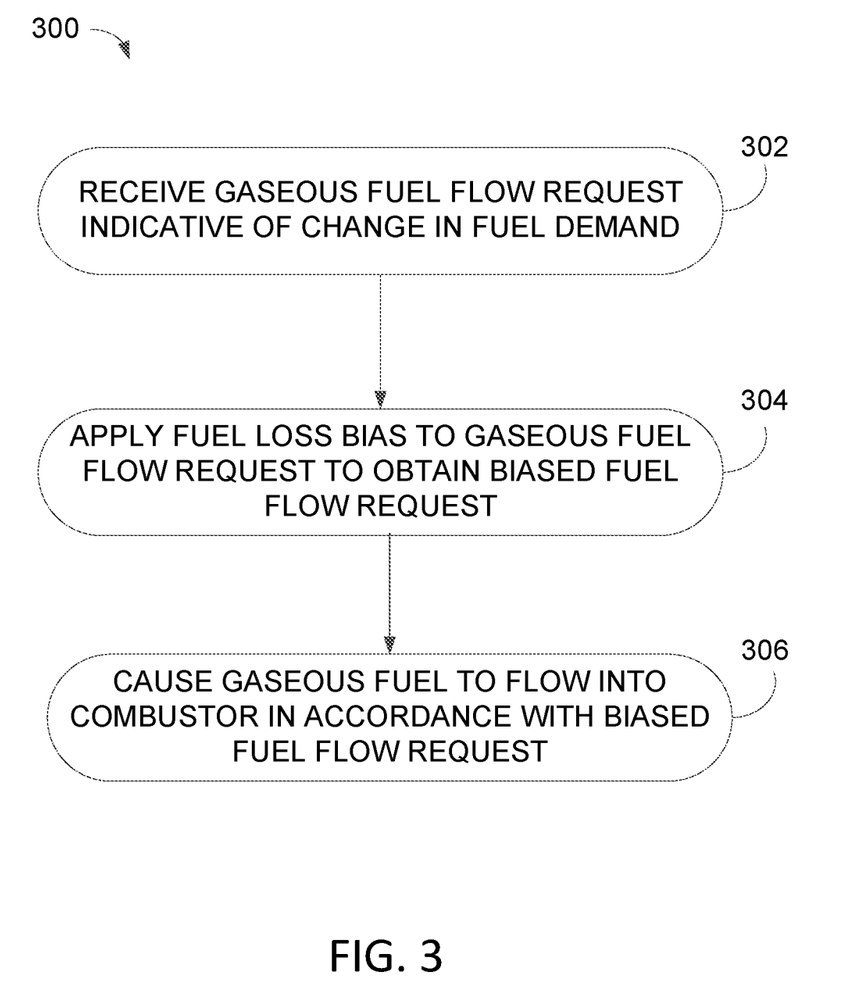
FIG. 3 is a flowchart of a method for managing changes in fuel demand for gaseous fuel engines.

The controller 110 is configured to account for the compressibility of gaseous fuel and the resulting leakage out of the manifold outlet 204. With reference to FIG. 3, there is illustrated a flowchart of an example method 300 for managing changes in fuel demand for engines operating with gaseous fuel. At step 302, a gaseous fuel flow request indicative of a change in fuel demand is received at the controller 110. The change in fuel demand may occur, for example during an engine start-up sequence, such as when filling the manifold, when transitioning to a start fuel flow schedule, or when transitioning to a closed-loop sub-idle acceleration fuel schedule. More generally, changes in fuel demand may occur when transitioning from a first fuel flow schedule to a second fuel flow schedule. Changes in fuel demand may also occur as part of normal engine operation, for example in response to a request from a pilot of an aircraft via a power lever angle (PLA) or other power control mechanism of the aircraft. The gaseous fuel flow request may be generated by the controller 110 or another device in response to an operator input, or in response to a detected status of the engine 100. In some embodiments, the gaseous fuel flow request is selected from a fuel flow schedule, which may be represented as a lookup table, a mathematical relationship, or any other format allowing a gaseous fuel flow to be associated with one or more aircraft and/or engine parameter.

At step 304, a fuel loss bias is applied to the gaseous fuel flow request to obtain a biased fuel flow request. The fuel loss bias corresponds to a quantity of gaseous fuel that should be added (positive bias) or removed (negative bias) from the gaseous fuel flow request in order to take into account the manifold leakage and provide a suitable amount of fuel to the combustor to reach a target (e.g. acceleration, power, speed). The fuel loss bias is associated with a compressibility of the gaseous fuel and varies with changes in mass flow rate of the gaseous fuel from the manifold 200 to the combustor 16.

In some embodiments, the change in mass flow rate is determined based on sensor measurements. For example, a mass flow meter may be used to measure a mass flow rate of the gaseous fuel (i.e. the mass of the fuel traveling past a fixed point per unit time), for example at the outlet 204 of the manifold 200, at the combustor 16, or at any position between the manifold 200 and the combustor 16. Changes in mass flow rate may be calculated by finding a difference between two mass flow rate measurements taken at different instances in time. In some embodiments, a mathematical relationship relating change in mass flow rate and fuel flow bias is used to determine the fuel flow bias to use for a given change in mass flow rate. In some embodiments, certain ranges of change in mass flow rate are associated with discrete fuel flow biases, for example through a lookup table. In some embodiments, discrete mass flow rate changes are associated with discrete fuel flow biases, and values in between the discrete values may be determined by interpolation, estimation, rounding, or other mathematical operation(s).

In some embodiments, pressure is used as a surrogate for mass flow rate, for example in the absence of a mass flow meter or other sensor used to measure flow. One or more pressure sensor may be used to measure the pressure, for example at the outlet 204 of the manifold 200, at the combustor 16, or at any position between the manifold 200 and the combustor 16. In some embodiments, a mathematical relationship relating change in pressure and fuel flow bias is used to determine the fuel flow bias to use for a given change in pressure. In some embodiments, certain ranges of change in pressure are associated with discrete fuel flow biases, for example through a lookup table. In some embodiments, discrete pressure changes are associated with discrete fuel flow biases, and values in between the discrete values may be determined by interpolation, estimation, rounding, or other mathematical operation(s).

Any other parameter that varies proportionally with a change in mass flow rate may be used instead of pressure. The suitable fuel flow bias for a given change in the varying parameter may be determined based on empirical data, mathematical modeling, or the like, based on various parameters of the system, such as the composition of the gaseous fuel, the expected and/or measured temperatures of the system, the shape and size of the manifold 200, and the size of the manifold outlet 204.

At step 306, the controller 110 causes the gaseous fuel to flow into the combustor 16 in accordance with the biased fuel flow request. Step 306 is understood to encompass any instructions sent by the controller 110 to the fuel system 120 to permit/stop/regulate fluid flow or pressure from a gaseous fuel supply into the fuel manifold 200 using the various arrangement of components provided upstream from the manifold 200. Examples include opening and closing on/off valves, modulating control valves, and the like.

Figure 4:
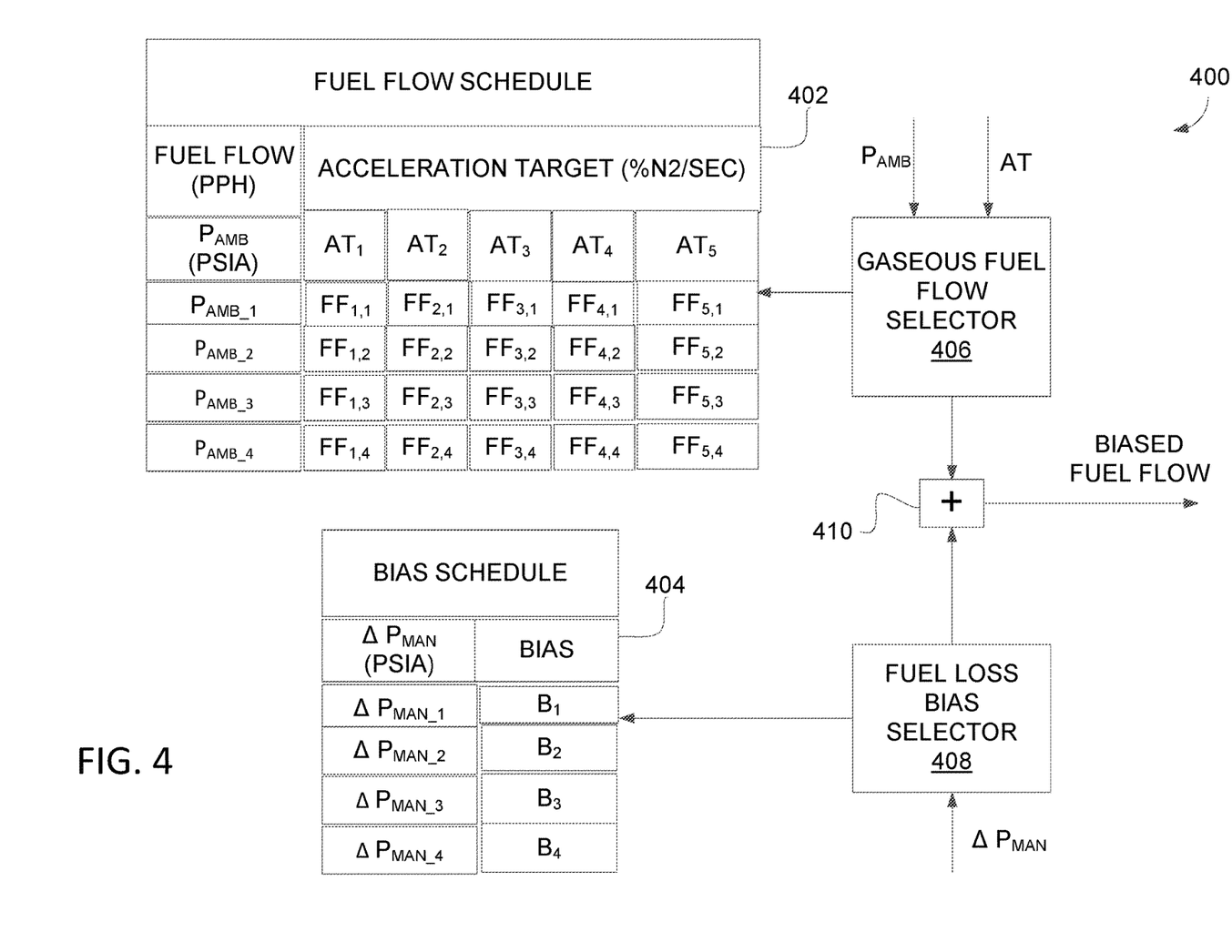
FIG. 4 is a block diagram of a system for managing changes in fuel demand for gaseous fuel engines.

FIG. 4 illustrates a specific and non-limiting example of a system 400 for implementing the method 300. A fuel flow schedule 402 is shown to relate fuel flow with two variables, namely an acceleration target and an altitude of the aircraft, as represented by the ambient pressure ($P_{AMB}$). For any given combination of acceleration target ($AT_n$) and ambient pressure ($P_{AMB\_m}$), there is provided a corresponding fuel flow ($FF_{n,m}$). A bias schedule 404 relates a fuel flow bias $B_q$ with a change in pressure in the manifold ($\Delta P_{MAN\_r}$). In some embodiments, $P_{MAN}$ corresponds to the pressure taken at the input of the combustor 16, known as "P3". In this example, n=1 to 5, m=1 to 4, q=1 to 4, and r=1 to 4, but these values may vary in accordance with practical implementation. Similarly, the fuel flow may depend on a single parameter or more than two parameters, for example flight phase, engine type, altitude (ambient pressure, temperature, thrust request, engine configuration (e.g. compressor bleed extraction & loading), etc. The fuel flow bias may depend on more than two parameters, such as temperature. The values for the fuel flow bias ($B_q$) have been determined using ideal gas laws and fluid mechanics. The fuel flow schedule 402 and/or bias schedule 404 may be stored locally to the controller 110 or remotely therefrom and accessed via one or more wired or wireless means.

A gaseous fuel selector 406 receives as input a given ambient pressure and a given acceleration target and selects from the fuel flow schedule 402 the corresponding fuel flow. The selected fuel flow is output to an adder 410. A fuel loss bias selector 408 receives as input a given change in manifold pressure, selects a corresponding fuel loss bias from the bias schedule 404, and outputs the fuel loss bias to the adder 410. The fuel loss bias is applied to the fuel flow by the adder 410 and a biased fuel flow is output. The biased fuel flow is used by the controller 110 to cause the gaseous fuel to flow into the combustor in order to meet the change in fuel demand.

It will be understood that the use of a bias schedule 404 for applying the fuel loss bias is exemplary only and may be replaced with other embodiments, such as performing various mathematical operations to determine mass flow rate and/or change in mass flow rate based on one or more measured, estimated, and/or synthesized engine and/or aircraft parameter.

In some embodiments, the engine 100 may be selectively operated with gaseous fuel and liquid fuel, and the fuel system 120 may be a dual fuel system. The method 300 may be triggered, for example by the controller 110, upon activation or selection of a gaseous fuel source. Alternatively, the method 300 may comprise, at the outset, a step of determining whether the fuel flow request as received is for gaseous fuel or liquid fuel, and step 302-306 are performed when it is determined that the fuel flow request is indeed for gaseous fuel.

Figure 5:
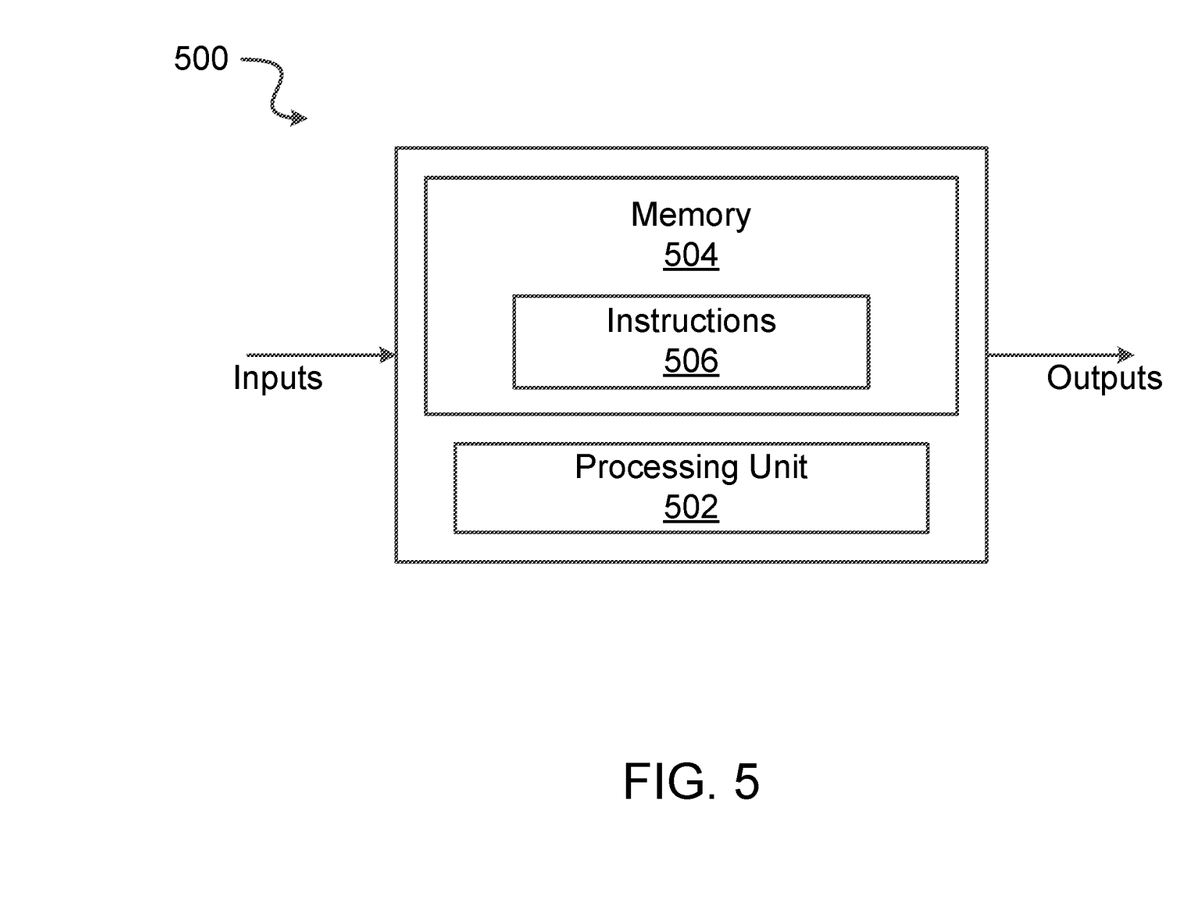
FIG. 5 is a block diagram of an example computing device.

With reference to FIG. 5, there is illustrated an embodiment of a computing device 500 for implementing part or all of the method 300 described above. The computing device 500 can be used to perform part or all of the functions of the controller 110 of the engine 100. In some embodiments, the controller 110 is composed only of the computing device 500. In some embodiments, the computing device 500 is within the controller 110 and cooperates with other hardware and/or software components within the controller 110. In both cases, the controller 110 performs the method 300. In some embodiments, the computing device 500 is external to the controller 110 and interacts with the controller 110. In some embodiments, some hardware and/or software components are shared between the controller 110 and the computing device 500, without the computing device 500 being integral to the controller 110. In this case, the controller 110 can perform part of the method 300.

The computing device 500 comprises a processing unit 502 and a memory 504 which has stored therein computer-executable instructions 506. The processing unit 502 may comprise any suitable devices configured to cause a series of steps to be performed such that instructions 506, when executed by the computing device 500 or other programmable apparatus, may cause the functions/acts/steps specified in the method 300 described herein to be executed. The processing unit 502 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

It should be noted that the computing device 500 may be implemented as part of a FADEC or other similar device, including an electronic engine control (EEC), engine control unit (EUC), engine electronic control system (EECS), an Aircraft Avionics System, and the like. In addition, it should be noted that the techniques described herein can be performed by a computing device 500 substantially in real-time.

The methods and systems described herein may be implemented in a high level procedural or object oriented programming or scripting language, or a combination thereof, to communicate with or assist in the operation of a computer system, for example the computing device 500. Alternatively, the methods and systems described herein may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon, or a computer program product. The computer program may comprise computer-readable instructions which cause a computer, or more specifically the processing unit 502 of the computing device 500, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, various feedback sensors in the fuel manifold can facilitate calculations of mass flow rate. The pressure may be obtained using one or more pressure sensor already present in the engine or one or more dedicated pressure sensor. Yet further modifications could be implemented by a person of ordinary skill in the art in view of the present disclosure, which modifications would be within the scope of the present technology.

The invention claimed is:

1. A method for operating an engine coupled to a fuel system having a fuel manifold configured to supply fuel to a combustor of the engine, the method comprising:
receiving a gaseous fuel flow request indicative of a change in demand for gaseous fuel to the engine;
measuring, via a pressure sensor, a pressure at a location between an input of the fuel manifold and an output of the combustor;
observing a change in the pressure at the location between the input of the fuel manifold and the output of the combustor, the change in the pressure associated with a change in mass flow rate of the gaseous fuel from the fuel manifold to the combustor in response to the change in demand;
applying a fuel loss bias to the gaseous fuel flow request to obtain a biased fuel flow request, the fuel loss bias associated with the change in pressure; and
compensating for a change in a fuel leakage flow from the manifold into the combustor, the change in the fuel leakage flow being caused by the change in mass flow rate, the compensating for the change in the fuel leakage flow comprising causing the gaseous fuel to flow into the combustor in accordance with the biased fuel flow request.

2. The method of claim 1, wherein the location is inside the fuel manifold.

3. The method of claim 1, further comprising selecting the fuel loss bias from a lookup table based on the change in the pressure.

4. The method of claim 1, wherein the change in demand is received during a manifold filling procedure.

5. The method of claim 1, wherein the change in demand is received during a transition from a first fuel flow schedule to a second fuel flow schedule.

6. The method of claim 5, wherein the transition from the first fuel flow schedule to the second fuel flow schedule takes place during an engine start sequence.

7. A system for operating an engine coupled to a fuel system, the fuel system having a fuel manifold configured to supply fuel to a combustor of the engine, the system comprising:

a processor; and
a non-transitory computer-readable medium having stored thereon program instructions executable by the processor for:
receiving a gaseous fuel flow request indicative of a change in demand for gaseous fuel to the engine;
receiving, via a pressure sensor, a measured pressure at a location between an input of the fuel manifold and an output of the combustor;
observing a change in the measured pressure at the location between the input of the fuel manifold and the output of the combustor, the change in the measured pressure associated with a change in mass flow rate of the gaseous fuel from the fuel manifold to the combustor in response to the change in demand;
applying a fuel loss bias to the gaseous fuel flow request to obtain a biased fuel flow request, the fuel loss bias associated with the change in the measured pressure; and
compensating for a change in a fuel leakage flow from the manifold into the combustor, the change in the fuel leakage flow being caused by the change in mass flow rate, the compensating for the change in the fuel leakage flow comprising causing the gaseous fuel to flow into the combustor in accordance with the biased fuel flow request.

8. The system of claim 7, wherein the location is inside the fuel manifold.

9. The system of claim 7, wherein the program instructions are further executable for selecting the fuel loss bias from a lookup table based on the change in the measured pressure.

10. The system of claim 7, wherein the change in demand is received during a manifold filling procedure.

11. The system of claim 7, wherein the change in demand is received during a transition from a first fuel flow schedule to a second fuel flow schedule.

12. The system of claim 11, wherein the transition from the first fuel flow schedule to the second fuel flow schedule takes place during an engine start sequence.

13. A system comprising:
an engine having a combustor;
a fuel system coupled to the engine, the fuel system comprising an arrangement of components connected between a gaseous fuel supply and a fuel manifold fluidly connected to the combustor via at least one set of nozzles; and
a controller coupled to the engine and the fuel system, the controller configured for:
receiving via a pressure sensor, a measured pressure at a location between an input of the fuel manifold and an output of the combustor;
observing a change in the measured pressure at the location between the input of the fuel manifold and the output of the combustor, the change in the measured pressure associated with a change in mass flow rate of the gaseous fuel from the fuel manifold to the combustor in response to the change demand;
applying a fuel loss bias to a gaseous fuel flow request to obtain a biased fuel flow request, the fuel loss bias associated with the change in the measured pressure; and
compensating for a change in a fuel leakage flow from the manifold into the combustor, the change in the fuel leakage flow being caused by the change in mass flow rate, the compensating for the change in the fuel leakage flow comprising causing the gaseous fuel to flow into the combustor in accordance with the biased fuel flow request.

14. The system of claim 13, wherein the controller is further configured for selecting the fuel loss bias from a lookup table based on the change in the measured pressure.

* * * * *